United States Patent
Hagihara

(10) Patent No.: US 8,648,290 B2
(45) Date of Patent: Feb. 11, 2014

(54) DATA SELECTION CIRCUIT, DATA TRANSMISSION CIRCUIT, RAMP WAVE GENERATION CIRCUIT, AND SOLID-STATE IMAGING DEVICE

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 301 days.

(21) Appl. No.: 13/115,497

(22) Filed: May 25, 2011

(65) Prior Publication Data

US 2011/0292260 A1 Dec. 1, 2011

(30) Foreign Application Priority Data

May 25, 2010 (JP) .................................. 2010-119480

(51) Int. Cl.
*H03H 11/26* (2006.01)
*H04N 5/335* (2011.01)

(52) U.S. Cl.
USPC .......................... 250/208.1; 348/294; 257/263

(58) Field of Classification Search
USPC ........................... 250/208.1; 327/263; 348/294
See application file for complete search history.

(56) References Cited

U.S. PATENT DOCUMENTS 8,344,782 B2 * 1/2013 Behrends et al. ............. 327/263

FOREIGN PATENT DOCUMENTS

| JP | 5-218820 A | 8/1993 |
|---|---|---|
| JP | 2000-162982 A | 6/2000 |
| JP | 2002-158933 A | 5/2002 |
| JP | 2005-217771 A | 8/2005 |
| JP | 2006-287879 A | 10/2006 |
| JP | 2007-243667 A | 9/2007 |

OTHER PUBLICATIONS

Japanese Office Action dated Nov. 19, 2013, issued in corresponding Japanese Patent Application No. 2010-119480 with English translation (6 pages).

* cited by examiner

*Primary Examiner* — Tony Ko
(74) *Attorney, Agent, or Firm* — Westerman, Hattori, Daniels & Adrian, LLP

(57) ABSTRACT

Provided are a data selection circuit, a data transmission circuit, a ramp wave generation circuit, and a solid-state imaging device. A delay section delays signals input to delay units of n (n is a natural number equal to or more than 3) stages that are connected to each other and have the same configuration and outputs delayed signals from the delay units. A delay control section controls a delay amount of the delay units. An output section performs a logical operation on signals output from i-th and j-th (i and j are natural numbers that are different from each other and equal to or more than 1 and equal to or less than n) delay units to generate a signal and outputs the signal to a k-th (k is a natural number equal to or more than 1 and equal to or less than m) first data selection pulse input terminal of a functional circuit having m (m is a natural number equal to or more than 2) first data selection pulse input terminals.

13 Claims, 14 Drawing Sheets

US 8,648,290 B2

DATA SELECTION CIRCUIT, DATA TRANSMISSION CIRCUIT, RAMP WAVE GENERATION CIRCUIT, AND SOLID-STATE IMAGING DEVICE

BACKGROUND OF THE INVENTION

1. Field of the Invention

The present invention relates to a data selection circuit that outputs a data selection signal to a functional circuit having a data selection pulse input terminal, and a data transmission circuit, a ramp wave generation circuit and a solid-state imaging device using the data selection circuit.

This application claims priority to and the benefits of Japanese Patent Application No. 2010-119480 filed on May 25, 2010, the disclosure of which is incorporated herein by reference.

2. Description of the Related Art

FIG. 14 illustrates a configuration example of a solid-state imaging device in which an analog-to-digital converter (ADC) is mounted for each pixel row.

A solid-state imaging device 1 illustrated in FIG. 14 includes an imaging section 2, a row scanning circuit 3, a column scanning circuit 4, a timing control circuit 5, an ADC group 6, a ramp wave generation circuit 7, a counter 8, and a data output circuit 9. The data output circuit 9 includes a sense amplifier circuit.

The imaging section 2 includes a photodiode and an amplifier inside a pixel. Unit pixels 20 that output pixel signals in response to the intensity or the quantity of an incident electromagnetic wave are arranged in the form of a matrix in the imaging section 2. The timing control circuit 5 is a control circuit for sequentially reading the pixel signals from the imaging section 2 and generates an internal clock. The row scanning circuit 3 controls row addressing or row scanning of the imaging section 2 via a row control line 11. The column scanning circuit 4 controls column addressing or column scanning of the ADC group 6. The ramp wave generation circuit 7 generates a ramp wave whose voltage value changes in a staircase pattern.

The ADC group 6 has an n-bit digital signal conversion function and includes a row ADC section 60 that is installed for each vertical signal line 13 corresponding to each pixel row. The row ADC section 60 includes a comparator 601 and a latch section 602. The comparator 601 compares the ramp wave generated by the ramp wave generation circuit 7 with an analog signal obtained through each vertical signal line 13 from the unit pixel 20 for each row control signal 11. The latch section 602 includes latch circuits 603 and 604 that retain a counting result of the counter 8 that counts a comparison time. Output of each latch section 602 is connected to a 2n-bit width horizontal transmission line 117. The data output circuit 9 includes 2n sense circuits that correspond to the horizontal lines 117, respectively.

Next, an operation of the solid-state imaging device 1 will be described. In a first read operation, a reset level including noise of the pixel signal is read from each unit pixel 20 of a selected row of the imaging section 2 as an analog pixel signal, and thereafter, in a second read operation, a signal level is read. The reset level and the signal level are input to the ADC group 6 through the vertical signal line 13 according to a time sequence.

After first reading from the unit pixel 20 of an arbitrary row to the vertical signal line 13 is stabilized, the ramp wave of the staircase pattern whose reference voltage has been temporally changed is generated by the ramp wave generation circuit 7 and input to the comparator 601. The comparator 601 compares a voltage of the arbitrary vertical signal line 13 with the ramp wave.

In parallel with the input of the ramp wave to the comparator 601, first counting is performed by the counter 8.

When the voltage level of the ramp wave is equal to the voltage of the arbitrary vertical signal line 13, an output of the comparator 601 is inverted, and at the same time, the counting value according to the comparison time period is retained in the latch unit 602. At the time of first reading, since a variation in the reset level of the unit pixel 20 is usually small and the reset voltage is common in all pixels, the output of the arbitrary vertical line 13 is approximately equal to a known value. Thus, at the time of first reset level reading, the comparison time period can be reduced by appropriately adjusting the voltage of the ramp wave.

At the time of second reading, in addition to the reset level, the signal level corresponding to an incident light amount of each unit pixel 20 is read, and the same operation as in the first reading is performed. That is, after second reading from the unit pixel 20 of an arbitrary row to the arbitrary vertical signal line 13 is stabilized, the ramp wave of the staircase pattern whose reference voltage has been temporally changed is generated by the ramp wave generation circuit 7 and input to the comparator 601. The comparator 601 compares a voltage of the arbitrary vertical signal line 13 with the ramp wave. In parallel with the input of the ramp wave to the comparator 601, second counting is performed by the counter 8.

When the voltage level of the ramp wave is equal to the voltage of the arbitrary vertical signal line 13, an output of the comparator 601 is inverted, and at the same time, the count value according to the comparison time period is retained in the latch section 602. The first counting value is retained, for example, in the latch circuit 603, and the second counting value is retained, for example, in the latch circuit 604.

After the two reading operations are finished, a first n-bit digital signal and a second n-bit digital signal retained in the latch section 602 are output via the 2n vertical transmission lines 117 and detected at the digital output circuit 9 by the column scanning circuit 4. Subsequently, in a subtraction circuit, after the signal obtained by the first reading is sequentially subtracted from the signal obtained by the second reading, the subtracted signal is output to the outside. Thereafter, the same operation is sequentially repeated for each row, and a two-dimensional image is generated.

Japanese Unexamined Patent Application, First Publication No. 2002-158933 discloses a scanning circuit that can be applied to a solid-state imaging device.

SUMMARY OF THE INVENTION (1) A data selection circuit according to a first aspect of the present invention includes a delay section that includes delay units of n stages (n is a natural number equal to or more than 3) that are connected to each other, delays signals input to the delay units, and outputs the delayed signals from the delay units; a delay control section that controls delay amounts of the delay units; and an output section that performs a logical operation on signals output from i-th and j-th (i and j are natural numbers that are different from each other and equal to or more than 1 and equal to or less than n) delay units to generate a signal having a predetermined logical state at a predetermined timing and outputs the generated signal to a k-th (k is a natural number equal to or more than 1 and equal to or less than m) first data selection pulse input terminal of a functional circuit having m (m is a natural number equal to or more than 2) first data selection pulse input terminals.

(2) Preferably, in the data selection circuit according to (1), the delay section configures an annular delay circuit in which the delay units are connected in the form of a ring so that a signal output from an n-th stage delay unit is input to a first stage delay unit.

(3) Preferably, in the data selection circuit according to (1), the output section further outputs one of an output of the delay unit and the signal generated by the logical operation.

(5) A ramp wave generation circuit according to a second aspect of the present invention includes the data selection circuit according to (1) and a functional circuit.

The functional circuit has the following configuration: an upper current source cell section that includes a plurality of upper current source cells generating the same constant current and is capable of selecting the upper current source cell outputting the constant current based on an upper selection signal; an upper bit control section that includes a second data selection pulse input terminal, generates the upper selection signal based on a signal input to the second data selection pulse input terminal, and controls the upper current source cell section; a lower current source cell section that includes a plurality of lower current source cells that have been weighted to generate current values that are different from each other by a predetermined rate to a current value of the constant current generated by the upper current source cell and a first data selection pulse input terminal and is capable of selecting the lower current source cell outputting an electric current based on a lower selection signal input to the first data selection pulse input terminal; an addition section that adds electric currents output from the selected upper current source cell and lower current source cell and outputs the added electric current; and a conversion section that converts the electric current output from the addition section into a voltage and outputs the voltage.

The data selection circuit outputs a signal as the lower selection signal to the first data selection pulse input terminal and outputs a signal to the second data selection pulse input terminal.

(6) Preferably in the ramp wave generation circuit according to (5), the upper bit control section includes shift register circuits that are almost the same in number as the upper current source cells.

In this case, the shift register circuits use a signal input to the second data selection pulse input terminal as a shift clock, cause shift outputs of the shift register circuits to sequentially become active based on the shift clock, generate the upper selection signal based on the shift outputs, and select the upper current source cell.

(7) A ramp wave generation circuit according to a third aspect of the present invention includes the data selection circuit according to (1) and a functional circuit.

The functional circuit has the following configuration: an upper current source cell section that includes a plurality of upper current source cells generating the same constant current and is capable of selecting the upper current source cell outputting the constant current based on an upper selection signal; an upper current source cell section that includes a plurality of upper current source cells generating the same constant current and is capable of selecting the upper current source cell outputting the constant current based on an upper selection signal; an upper bit control section that includes a second data selection pulse input terminal, generates the upper selection signal based on a signal input to the second data selection pulse input terminal, and controls the upper current source cell section; a lower current source cell section that includes a plurality of lower current source cells that generate current values of a predetermined rate to a current value of the constant current generated by the upper current source cell and is capable of selecting the lower current source cell outputting an electric current; a lower bit control section that has a first data selection pulse input terminal and controls the lower current source cell section based on a lower selection signal input to the first data selection pulse input terminal; an addition section that adds electric currents output from the selected upper current source cell and the lower current source cell and outputs the added electric current; and a conversion section that converts the electric current output from the addition section into a voltage and outputs the voltage.

The data selection circuit outputs a signal as the lower selection signal to the first data selection pulse input terminal and outputs the signal to the second data selection pulse input terminal.

(8) Preferably in the ramp wave generation circuit according to (7), the upper bit control section includes shift register circuits that are almost the same in number as the upper current source cells.

In this case, the shift register circuits use a signal input to the second data selection pulse input terminal as a shift clock, cause shift outputs of the shift register circuits to sequentially become active based on the shift clock, generate the upper selection signal based on the shift outputs, and select the upper current source cell.

(9) A solid-state imaging device according to a fourth aspect of the present invention includes an imaging section in which a plurality of pixels outputting a pixel signal in response to the intensity or the quantity of an incident electromagnetic wave are arranged in the form of a matrix; and the ramp wave generation circuit according to (5).

(10) A solid-state imaging device according to a fifth aspect of the present invention includes an imaging section in which a plurality of pixels outputting a pixel signal in response to the intensity or the quantity of an incident electromagnetic wave are arranged in the form of a matrix; and the ramp wave generation circuit according to (6).

(11) A solid-state imaging device according to a sixth aspect of the present invention includes an imaging section in which a plurality of pixels outputting a pixel signal in response to the intensity or the quantity of an incident electromagnetic wave are arranged in the form of a matrix; and the ramp wave generation circuit according to (7).

(12) A solid-state imaging device according to a seventh aspect of the present invention includes an imaging section in which a plurality of pixels outputting a pixel signal in response to the intensity or the quantity of an incident electromagnetic wave are arranged in the form of a matrix; and the ramp wave generation circuit according to (8).

(13) A data transmission circuit according to a eighth aspect of the present invention includes a scanning section that includes the data selection circuit according to (1); and a functional circuit.

The functional circuit has the following configuration: data retention sections of m stages that retain data corresponding to an input level and output the data based on a selection signal input to the first data selection pulse input terminals; a transmission line through which the data output from the data retention section is transmitted; and a detection section that is connected to the transmission line and detects the transmitted data.

The scanning section outputs a signal output from the data selection circuit to the first data selection pulse input terminal as the data selection signal.

(14) A solid-state imaging device according to a ninth aspect of the present invention includes an imaging section in which a plurality of pixels outputting a pixel signal in response to the intensity or the quantity of an incident electromagnetic wave are arranged in the form of a matrix; and the data transmission circuit according to (13).

PREFERRED EMBODIMENTS

Hereinafter, embodiments of the present invention will be described with reference to the accompanying drawings. First to fourth embodiments will be described in connection with a data selection circuit that generates a data selection pulse. Fifth to ninth embodiments will be described in connection with various circuits to which a data selection circuit is applied.

(First Embodiment)

Figure 1:
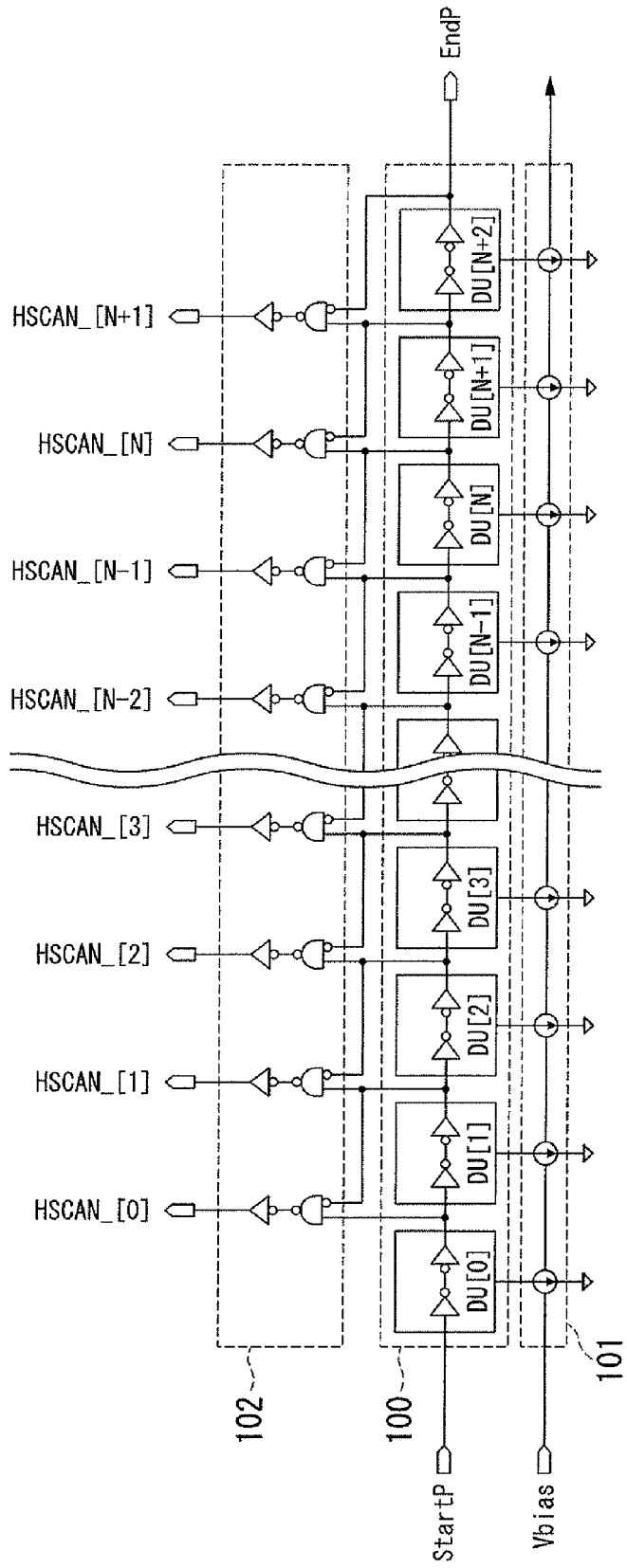
FIG. 1 is a block diagram illustrating a configuration of a data selection circuit according to a first embodiment of the present invention.

First, a first embodiment of the present invention will be described. FIG. 1 illustrates a configuration of a data selection circuit according to the present embodiment. The data selection circuit illustrated in FIG. 1 includes a delay section 100, a delay control section 101, and an output section 102.

Hereinafter, the configuration of the data selection circuit illustrated in FIG. 1 will be described. The delay section 100 has a configuration in which a plurality of stages of delay units DU[*] (* ranges from 0 to N+2, where N is an arbitrary positive integer) that delay an input signal are connected. In the delay section 100, a start pulse (=StartP) input to the first stage delay unit DU[0] is delayed through the delay units and output from the final stage delay unit DU[N+2]. The delay units DU[*] have the same configuration in which inverter circuits constituting an inversion element are connected in two stages. In FIG. 1, in each delay unit DU[*], the inverter circuits of the two stages are connected. In the present embodiment, the number of stages of the inverter circuits may change according to a desired delay amount without being limited to the configuration of FIG. 1. The delay control unit 101 is configured with a variable current source that controls a delay amount of the delay unit DU[*]. A current value of the variable current source is controlled by changing a bias voltage Vbias.

The output section 102 generates a pulse signal having a predetermined logic at a predetermined timing by performing a logical operation on signals output from the plurality of delay units DU[*]. The output section 102 outputs the generated pulse signal to a first data selection pulse input terminal of a functional circuit that implements a predetermined function. The output section 102 includes a two-input NAND circuit and an inverter circuit. Among neighboring delay units, a signal output from the delay unit of the previous stage side is input to one input terminal of the two-input NAND circuit, and a signal output from the delay unit of the subsequent stage side is input to the other input terminal of the two-input NAND circuit. A signal output from the two-input NAND circuit is inverted by the inverter circuit in order to obtain a desired logic and output as an output HSCAN_[*]. That is, the output section 102 outputs a signal obtained by performing a logical product operation (AND) of the signal output from the delay unit of the previous stage side and the inverted signal of the signal output from the delay unit of the subsequent stage side.

The delay unit is not limited to the above configuration. A set function or a reset function may be provided. The delay control section is also not limited to the above configuration. In FIG. 1, the current source is installed on the lower side of the delay unit, but the current source is not limited thereto and may be installed on the upper side or both the lower side and the upper side rather than the lower side. Further, the output section is also not limited to the above configuration.

Figure 2:
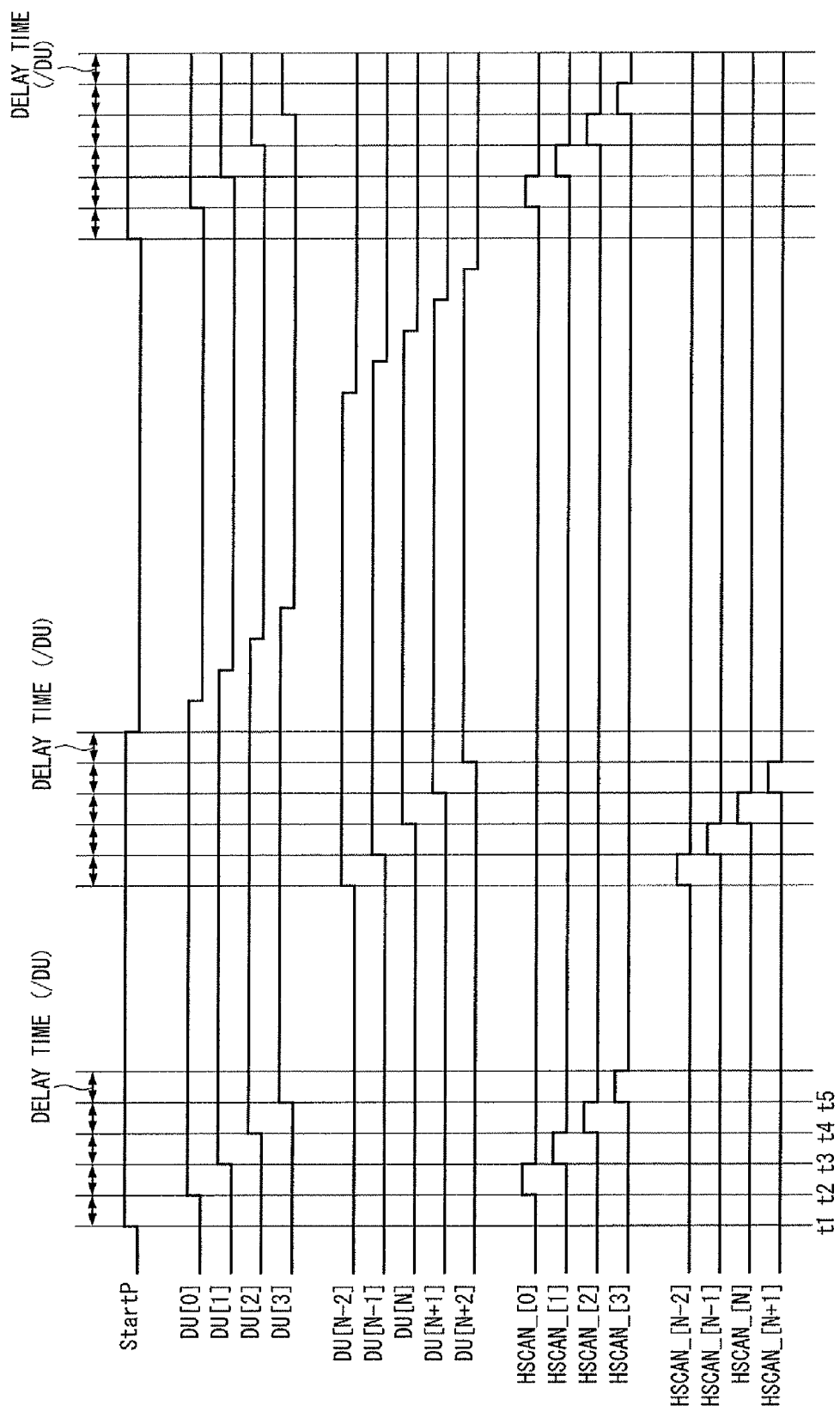
FIG. 2 is a timing chart illustrating an operation of the data selection circuit according to the first embodiment of the present invention.

Next, an operation of the data selection circuit illustrated in FIG. 1 will be described with reference to a timing chart of FIG. 2. In a state before an operation starts, the start pulse (=StartP), outputs of the delay units DV[*], and outputs HSCAN_[*] of the output section 102 have a logical state of Low. First, at a time t1, the logical state of the start pulse changes from Low to High, so that the delay units DU[ ] that configure the delay section 100 start a transition operation. The output section 102 generates a signal obtained by performing a logical product operation of an output of the delay unit DU[n] (n is an integer of 0≤n≤N+1) and an inverted output of an output of the delay unit DU[n+1]. The generated signal is output to a first data selection pulse input terminal of a k-th (k is an integer of 1≤k≤m, where m is an arbitrary positive integer) stage of the functional circuit (not shown) as an output HSCAN_[n] of an n-th stage of the data selection circuit.

At a time t2 at which a predetermined delay time has elapsed from the time t1, the logical state of the output of the delay unit DU[0] changes to High. At this time, the logical state of the output HSCAN [0] becomes High based on the output (High) of the delay unit DU[0] and the inverted output (High) of the output of the delay unit DU[1]. Subsequently, at a time t3 at which a predetermined delay time has elapsed from the time t2, the logical state of the output of the delay unit DU[1] changes to High. At this time, the logical state of the output HSCAN_[0] becomes Low based on the output (High) of the delay unit DU[0] and the inverted output (Low) of the output of the delay unit DU[1]. The logical state of the output HSCAN_[1] becomes High based on the output (High) of the delay unit DU[1] and the inverted output (High) of the output of the delay unit DU[2].

Through the same operation as described above, the logical state of the output HSCAN_[2] becomes High at a time t4, the logical state of the output HSCAN_[3] becomes High at a time t5, and the same operation is subsequently repeated. When the logical state of the start pulse changes from High to Low, the outputs of the delay units DU[*] sequentially become Low.

According to the above-described operation, during a time period corresponding to a time period during which the logical state of the start pulse maintains High, the logical state of the output of the delay unit DU[*] maintains High, and the logical state of the output HSCAN_[*] of the output section 102 becomes High only during a delay time of the delay unit DU[*]. That is, a shift output in which a High state sequentially shifts as the outputs HSCAN_[0], HSCAN_[1], HSCAN_[2], ..., and HSCAN_[*] of the output section 102 as illustrated in FIG. 2 is obtained.

According to the present embodiment, it is possible to operate the data selection circuit merely by changing the logical state of the start pulse. That is, since it is unnecessary to perform shaping of a driving clock for driving the data selection circuit, the data selection circuit can be easily operated at a high speed.

(Second Embodiment)

Figure 3:
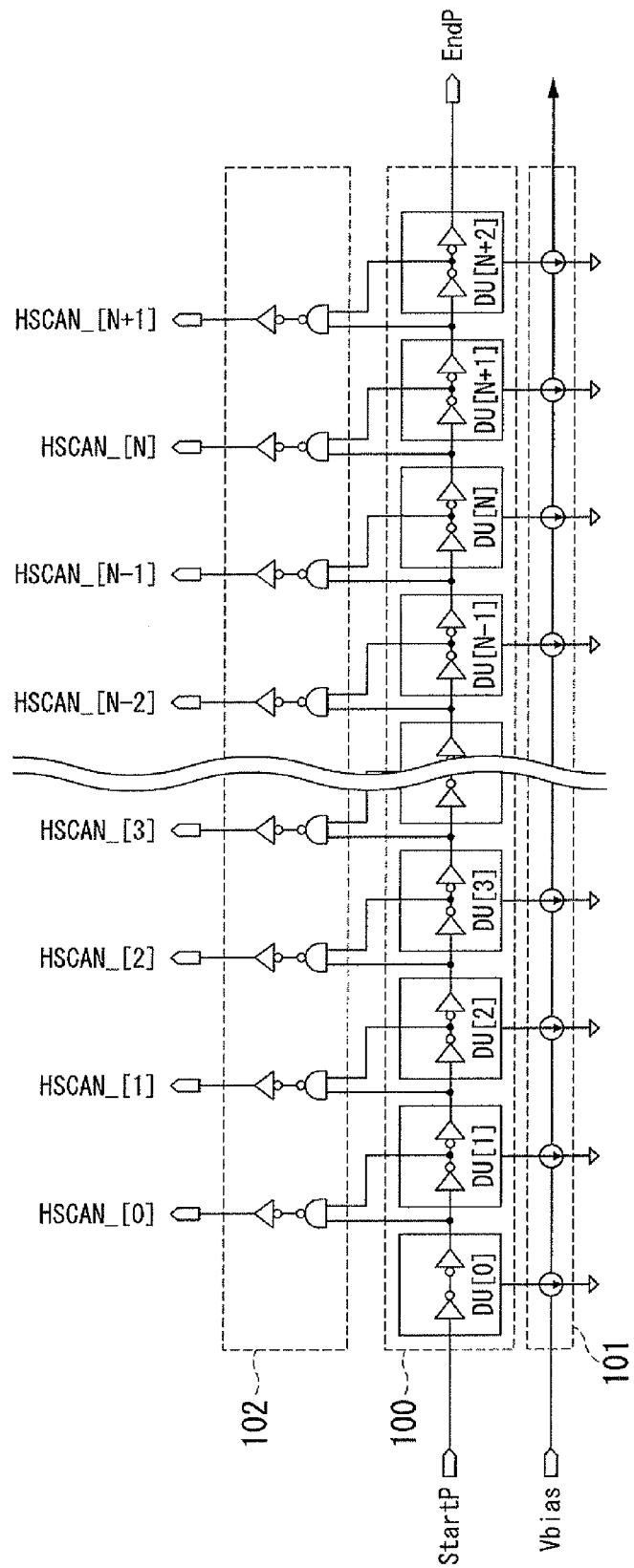
FIG. 3 is a block diagram illustrating a configuration of a data selection circuit according to a second embodiment of the present invention.

Next, a second embodiment of the present invention will be described. FIG. 3 illustrates a configuration of a data selection circuit according to the present embodiment. The data selection circuit illustrated in FIG. 3 includes a delay section 100, a delay control section 101, and an output section 102.

Hereinafter, the configuration of the data selection circuit illustrated in FIG. 3 will be described. The delay section illustrated in FIG. 3 is different from the data selection circuit illustrated in FIG. 1 in a configuration of a two-input NAND circuit that configures the output section 102 and a connection of an input signal to the two-input NAND circuit. Specifically, an inversion element that configures the delay unit is used in place of the inverter circuit for inverting one input signal of the two-input NAND circuit. The remaining configuration is similar to the configuration of the data selection circuit illustrated in FIG. 1, and thus a description thereof is omitted. Further, an operation of the data selection circuit illustrated in FIG. 3 is also similar to the operation of the data selection circuit illustrated in FIG. 1, and thus a description thereof is omitted.

According to the present embodiment, the circuit configuration of the output section can be simplified.

(Third Embodiment)

Figure 4:
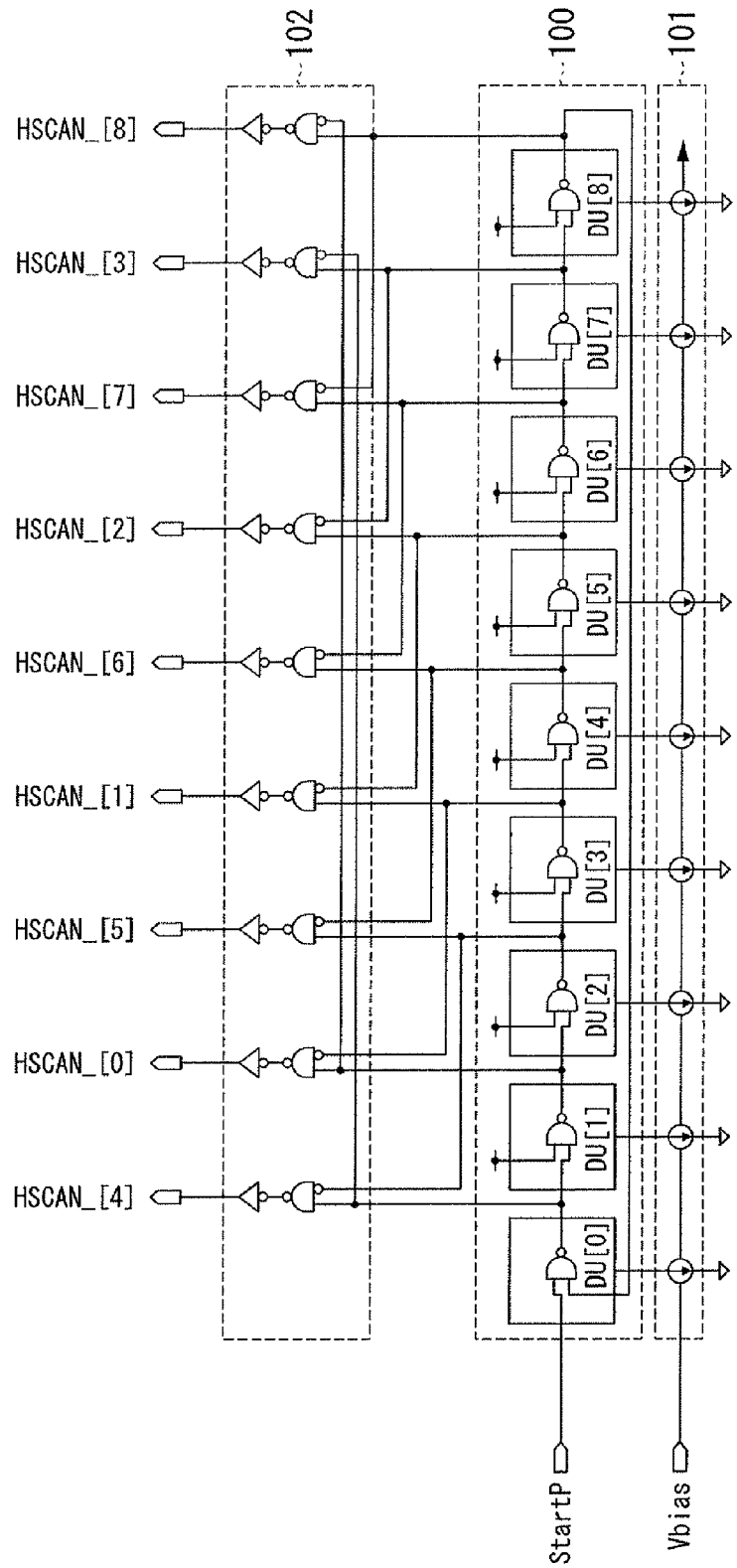
FIG. 4 is a block diagram illustrating a configuration of a data selection circuit according to a third embodiment of the present invention.

Next, a third embodiment of the present invention will be described. FIG. 4 illustrates a configuration of a data selection circuit according to the present embodiment. The data selection circuit illustrated in FIG. 4 includes a delay section 100, a delay control section 101, and an output section 102.

Hereinafter, the configuration of the data selection circuit illustrated in FIG. 4 will be described. A delay unit DU[*] (* is an integer ranging from 0 to 8) that configures the delay section 100 is configured with a two-input NAND circuit. A start pulse (=StartP) is input to one input terminal of the first stage delay unit DU[0], and a signal output from the final stage delay unit DU[8] is input to the other input terminal. A signal output from the previous stage delay unit is input to one input terminal of each of the second to ninth stage delay units DU[1] to DU[8], and a predetermined voltage is input to the other input terminal thereof. As a result, the delay section 100 configures an annular delay circuit in which the delay units DU[*] of 9 stages are connected in the form of a ring.

In the output section 102, a signal output from a first delay unit is input to one input terminal of the two-input NAND circuit, and a signal output from a third delay unit that is two stages forward the first delay unit is inverted and input to the other input terminal of the two-input NAND circuit. The remaining configuration is similar to the configuration of the data selection circuit illustrated in FIG. 1, and thus a description thereof is omitted.

Figure 5:
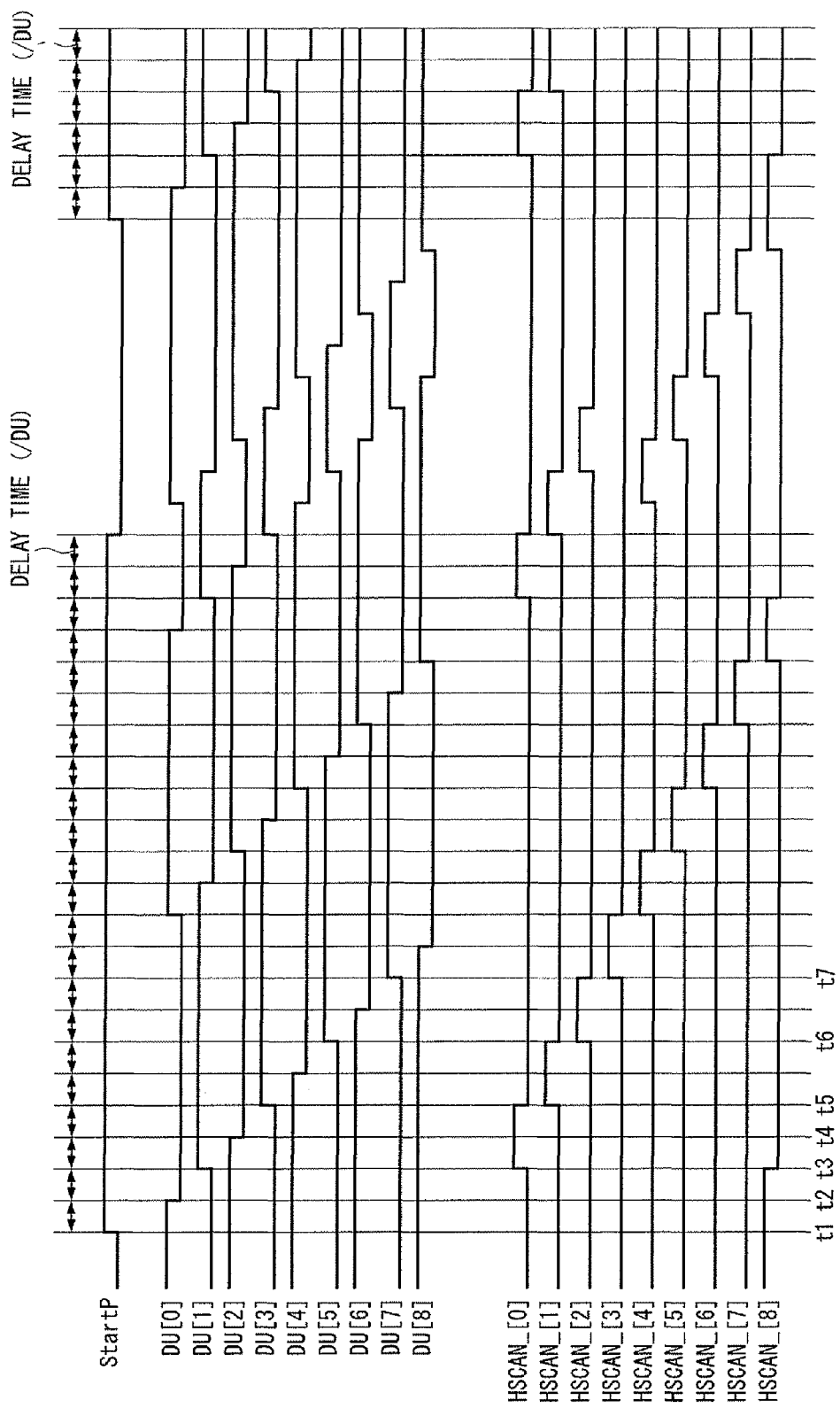
FIG. 5 is a timing chart illustrating an operation of the data selection circuit according to the third embodiment of the present invention.

Next, an operation of the data selection circuit illustrated in FIG. 4 will be described with reference to a timing chart of FIG. 5. In a state before an operation starts, the start pulse (=StartP), outputs of the delay units DU[1], DU[3], DU[5], and DU[7], and outputs HSCAN_[0] HSCAN_[0] to HSCAN_[7] of the output section 102 have a logical state of Low. Further, outputs of the delay units DU[0], DU[2], DU[4], DU[6], and DU[8] and an output HSCAN_[8] of the output section 102 have a logical state of High. First, at a time t1, the logical state of the start pulse changes from Low to High, so that the delay units DU[*] that configure the delay section 100 start a transition operation. The output section 102 generates a signal obtained by performing a logical product operation of an output of the delay unit DU[*] (* is an integer of 0≤*≤8) and an inverted output of an output of the delay unit that is two stages thereforward. The generated signal is output to a first data selection pulse input terminal of the functional circuit (not shown) as a predetermined output HSCAN_[*'] of the data selection circuit (*' is an integer of 0≤*≤8).

At a time t2 at which a predetermined delay time has elapsed from the time t1, the logical state of the output of the delay unit DU[0] changes to Low. Subsequently, at a time t3 at which a predetermined delay time has elapsed from the time t2, the logical state of the output of the delay unit DU[1] changes to High. At this time, the logical state of the output HSCAN_[0] HSCAN_[0] becomes High based on the output (High) of the delay unit DU[1] and the inverted output (High) of the output of the delay unit DU[3].

Subsequently, at a time t4 at which a predetermined delay time has elapsed from the time t3, the logical state of the output of the delay unit DU[2] changes to Low. At this time, since the output of the delay unit DU[1] and the output of the delay unit DU[3] do not change, the logical state of the output HSCAN_[0] HSCAN_[0] remains High. Subsequently, at a time t5 at which a predetermined delay time has elapsed from the time t4, the logical state of the output of the delay unit DU[3] changes to High. At this time, the logical state of the output HSCAN_[0] HSCAN_[0] becomes Low based on the output (High) of the delay unit DU[1] and the inverted output (Low) of the output of the delay unit DU[3]. Further, the logical state of the output HSCAN_[1]HSCAN_[1] becomes High based on the output (High) of the delay unit DU[3] and the inverted output (High) of the output of the delay unit DU[5].

Through the same operation as described above, at a time t6, the logical state of the output HSCAN_[1]HSCAN_[1] becomes Low, and the logical state of the output HSCAN_[2]HSCAN_[2] becomes High. At a time t7, the logical state of the output HSCAN_[2]HSCAN_[2] becomes Low, and the logical state of the output HSCAN_[3] becomes High. The same operation is subsequently repeated. When the logical state of the start pulse changes from High to Low, the outputs of the delay units DU[*] sequentially become the initial state.

According to the above-described operation, a shift output in which a High state sequentially shifts as the outputs HSCAN_[0], HSCAN_[1], HSCAN_[2], ..., and HSCAN_[*] (*' is an integer of the output section 102 is obtained.

According to the present embodiment, it is possible to operate the data selection circuit merely by changing the logical state of the start pulse. That is, since it is unnecessary to perform shaping of a driving clock for driving the data selection circuit, the data selection circuit can be easily operated at a high speed. Further, since the signal output from the final stage delay unit DU[8] is input to the first stage delay unit DU[0], the output of the delay unit DU[*] periodically changes. As a result, the output HSCAN_[*] of the output section 102 also periodically changes, and thus it is possible to periodically generate the data selection pulse.

(Fourth Embodiment)

Figure 6:
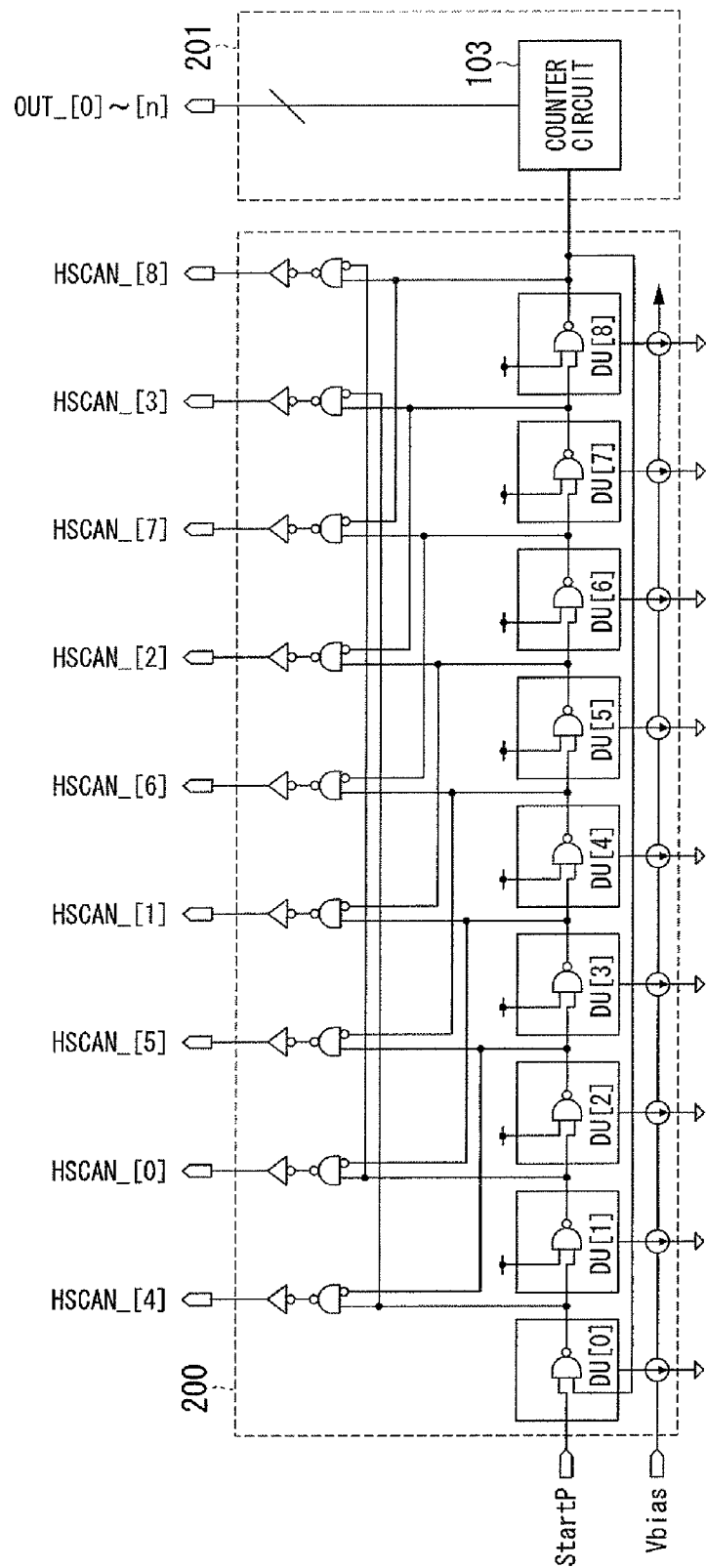
FIG. 6 is a block diagram illustrating a configuration of a data selection circuit according to a fourth embodiment of the present invention.

Next, a fourth embodiment of the present invention will be described. FIG. 6 illustrates a configuration of a data selection circuit according to the present embodiment. The data selection circuit illustrated in FIG. 6 includes a data selection section 200 and a counting section 201.

Hereinafter, the configuration of the data selection circuit illustrated in FIG. 6 will be described. A configuration of the data selection section 200 is the same as the configuration of the data selection circuit illustrated in FIG. 4, and thus a description thereof is omitted. The counting section 201 includes a counter circuit 103 that performs counting based on the output of the delay unit DU[8] in the data selection section 200. A counting result of the counter circuit 103 is output to a second data selection pulse input terminal of the functional circuit that implements a predetermined function.

Next, an operation of the data selection circuit illustrated in FIG. 6 will be described. An operation of the data selection section 200 is the same as the operation described in the third embodiment (FIG. 5), and thus a description thereof is omitted. The counter circuit 103 counts the number of circulations of a pulse that circulates the annular delay circuit by performing counting at a timing of a rising edge or a falling edge of the output of the delay unit DU[8] (a timing at which the output of the delay unit DU[8] changes). An output OUT_[*] (* is an integer equal to or more than zero (0)) of the counter circuit 103 is output to the second data selection pulse input terminal (not shown) of the functional circuit.

According to the present embodiment, the data selection circuit can be diversified, for example, by using the output of the delay section among the outputs of the data selection circuit as a lower data selection pulse and the output of the counting section as an upper data selection pulse. An example of performing data selection by the lower data selection pulse and the upper data selection pulse will be described in a sixth embodiment.

(Fifth Embodiment)

Figure 7:
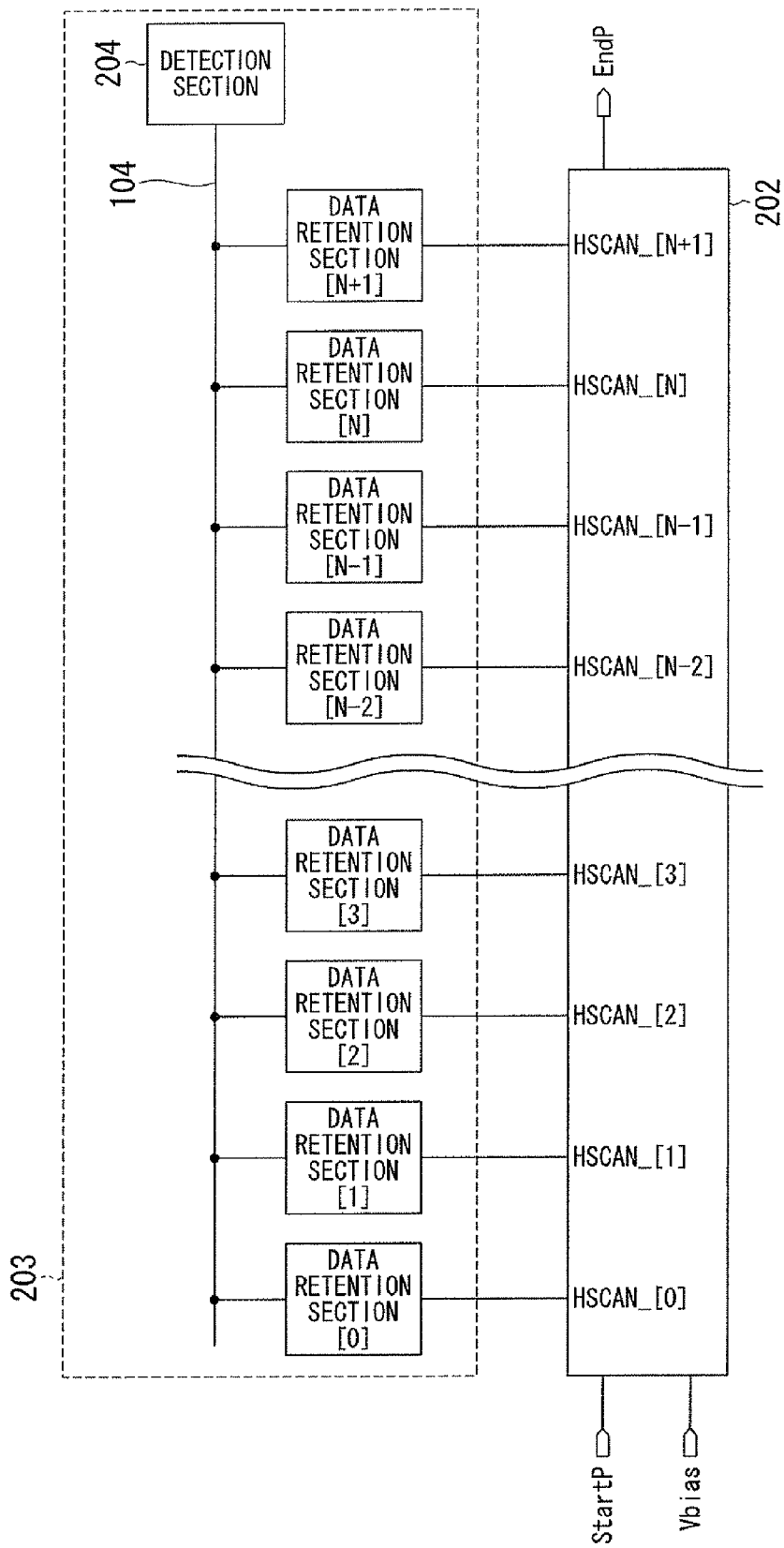
FIG. 7 is a block diagram illustrating a configuration of a data transmission circuit according to a fifth embodiment of the present invention.

Next, a fifth embodiment of the present invention will be described. FIG. 7 illustrates a configuration of a data transmission circuit according to the present embodiment. The data transmission circuit illustrated in FIG. 7 includes a data selection section 202 and a functional circuit 203.

Hereinafter, the configuration of the data transmission circuit illustrated in FIG. 7 will be described. Since a configuration of the data selection section 202 is the same as the configuration of the data selection circuit illustrated in FIG. 1, a description thereof is omitted. The functional circuit 203 is a circuit that performs data retention, data transmission, and data detection. The functional circuit 203 includes data retention sections [0] to [N+1] (N is an arbitrary positive integer) that retain data, a transmission line 104 through which data retained in the data retention section is transmitted, and a detection section 204 that is connected to the transmission line 104 and detects the transmitted data. Each data retention section has a first data selection pulse input terminal to which the signal output from the data selection section 202 is input. For example, data retained by the data retention section is digital data corresponding to a level of the pixel signal output from the pixel. Further, the data selection section 202 configures a scanning section for selecting and scanning data retained in the data retention section. The detection section 204 detects the logical state of data selected by the data selection section 202 at a high speed. A transmission time of the data transmission circuit can be controlled by changing the bias voltage Vbias for controlling the delay time of the delay unit (not shown) that configures the data selection section 202.

Next, an operation of the data transmission circuit illustrated in FIG. 7 will be described. Since an operation of the data selection section 202 is the same as the operation described in the first embodiment (FIG. 2), a description thereof is omitted. An output HSCAN_[*] (* ranges from 0 to N+1, where N is an arbitrary positive integer) of the data selection section 202 is output to the corresponding data retention section [*]. When the logical state of the output HSCAN_[*] of the data selection section 202 transitions from Low to High, data retained in the data retention section [*] is output to the transmission line 104, and the logical state of the data output to the transmission line 104 is detected by the detection section 204. The logical states of the outputs HSCAN_[0], HSCAN_[1], HSCAN_[2], ..., and HSCAN_[*] of the data selection section 202 sequentially transition from Low to High, and thus data retained in the data retention sections [0], [1], [2], ..., and [*] is sequentially output to the transmission line 104 and detected by the detection section 204.

According to the present embodiment, since it is unnecessary to perform shaping of a shift clock that is a driving clock for driving the scanning section, the scanning section can be easily operated at a high speed. Further, the selected data can be detected at a high speed, and thus the speed of the data transmission circuit can increase.

(Sixth Embodiment)

Figure 8:
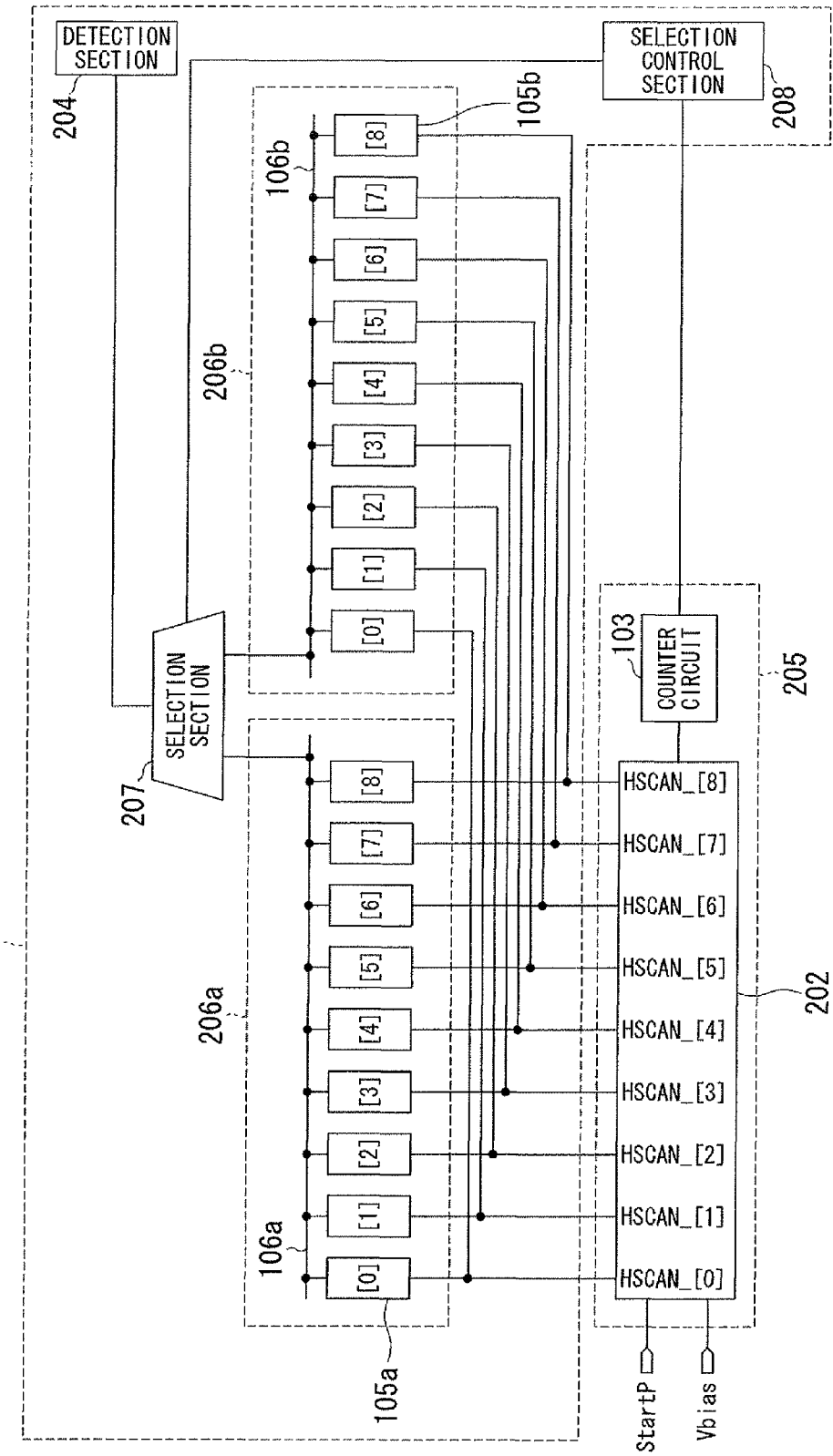
FIG. 8 is a block diagram illustrating a configuration of a data transmission circuit according to a sixth embodiment of the present invention.

Next, a sixth embodiment of the present invention will be described. FIG. 8 illustrates a configuration of a data transmission circuit according to the present embodiment. The data transmission circuit illustrated in FIG. 8 includes a data selection circuit 205 and a functional circuit 206.

Hereinafter, the configuration of the data transmission circuit illustrated in FIG. 8 will be described. The data selection circuit 205 includes a data selection section 202 and a counter circuit 103. Since a configuration of the data selection section 202 is the same as the configuration of the data selection circuit illustrated in FIG. 4, a description thereof is omitted. The counter circuit 103 performs counting based on the output of the delay unit DU[8] in the data selection section 202.

The functional circuit 206 includes sub functional circuits 206a and 206b corresponding to two groups, a selection section 207, a selection control section 208, and a detection section 204. The sub functional circuit 206a includes a data retention section 105a that retains data and a data transmission line 106a through which data retained in the data retention section 105a is transmitted. The sub functional circuit 206b includes a data retention section 105b that retains data and a data transmission line 106b through which data retained in the data retention section 105b is transmitted. Each of the data retention sections 105a and 105b has a first data selection pulse input terminal to which the signal output from the data selection circuit 205 is input. For example, data retained by the data retention sections 105a and 105b is digital data corresponding to a level of the pixel signal output from the pixel. Further, the data selection section 202 configures a scanning section for selecting data retained in the data retention sections 105a and 105b.

The selection section 207 selects any one of the sub functional circuits 206a and 206b corresponding to the two groups based on a selection pulse from the selection control section 208. The selection control section 208 outputs the selection pulse to the selection section 207 based on the output of the counter circuit 103. The detection section 204 detects the logical state of data output from the sub function circuit selected by the selection section 207. A transmission time of the data transmission circuit can be controlled by changing the bias voltage Vbias for controlling the delay time of the delay unit (not shown) that configures the data selection circuit 205.

Next, an operation of the data transmission circuit illustrated in FIG. 8 will be described. Since an operation of the data selection section 202 is the same as the operation described in the third embodiment (FIG. 4), a description thereof is omitted. Outputs HSCAN[*] (* ranges from 0 to 8) of the data selection section 202 are output to the corresponding data retention sections 105a and 105b of the sub function circuits 206a and 206b. When the logical states of the outputs HSCAN[*] of the data selection section 202 transition from Low to High, data retained in the data retention section is output to the transmission line 106a and 106b.

The selection control section 208 outputs the selection pulse to the selection section 207 based on the output of the counter circuit 103. The selection section 207 selects the sub functional circuit of the group represented by the selection pulse and outputs the output of the selected sub functional circuit to the detection section 204. The detection section 204 detects the logical state of data output to the transmission line 106a or 106b.

The output of the counter circuit 103 represents the number of circulations of the pulse that circulates the annular delay circuit that configures the data selection section 202. The selection control section 208 outputs the selection pulse for alternately selecting the two groups according to the number of circulations. As a result, for example, data retained in the data retention sections 105a in the sub functional circuit 206a is sequentially transmitted, data retained in the data retention sections 105b in the sub functional circuit 206b is sequentially transmitted, and this operation can be repeated. In this example, the case in which the functional circuit is divided into the two groups has been described, but the present invention is not limited thereto.

According to the present embodiment, by reducing the number of data retention circuits connected to each transmission line, a load can be reduced, and the data transmission rate can be further increased.

(Seventh Embodiment)

Figure 9:
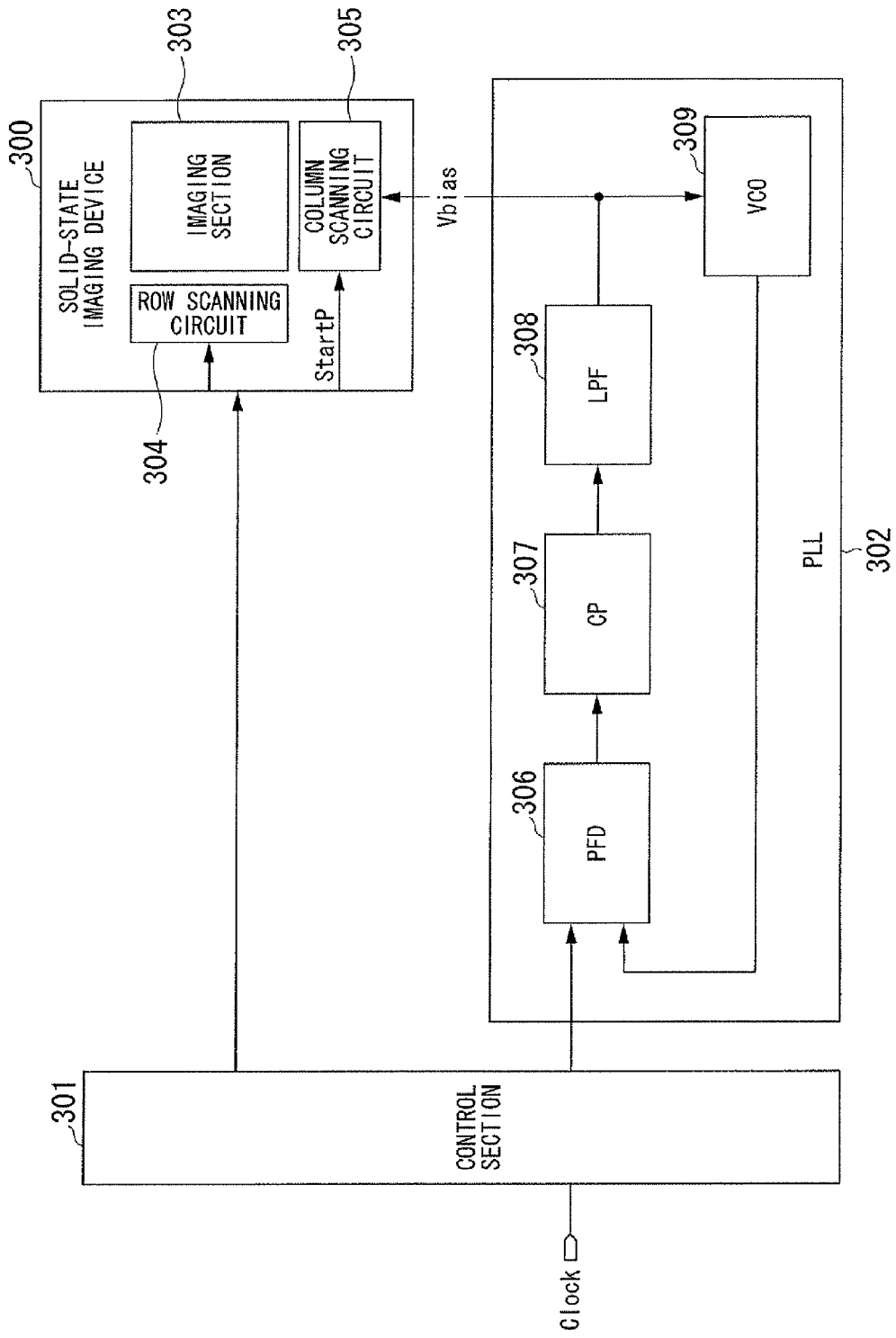
FIG. 9 is a block diagram illustrating a configuration of an imaging device according to a seventh embodiment of the present invention.

Next, a seventh embodiment of the present invention will be described. FIG. 9 illustrates a configuration of an imaging device according to the present embodiment. The imaging device illustrated in FIG. 9 includes a solid-state imaging device 300, a control section 301, and a phase locked loop (PLL) circuit 302.

Hereinafter, a configuration of the imaging device illustrated in FIG. 9 will be described. The solid-state imaging device 300 includes an imaging section 303, a row scanning circuit 304, and a column scanning circuit 305. The imaging section 303 includes a plurality of pixels that output a pixel signal according to the intensity or the quantity of an incident electromagnetic wave. The pixels are arranged in the form of a matrix. The row scanning circuit 304 controls the pixels in the imaging section 303. The column scanning circuit 305 controls transmission of the pixel signals from the pixels. For example, the column scanning circuit 305 corresponds to the data transmission circuit illustrated in FIG. 7.

The PLL circuit 302 includes a phase comparator (a phase frequency detector) 306, a charge pump 307, a low pass filter 308, and a VCO (Voltage Controlled Oscillator) 309. The phase comparator 306 compares phases of two clocks, that is, a clock from a control section 301 and a clock from the VCO 309. The charge pump 307 outputs a voltage according to the comparison result. The low pass filter 308 removes a high frequency component of an input signal. An output of the low pass filter 308 is input to the VCO 309 and also input to the delay control section in the column scanning circuit 305. The VCO 309 outputs a clock of a frequency based on the output of the low pass filter 308.

Figure 14:
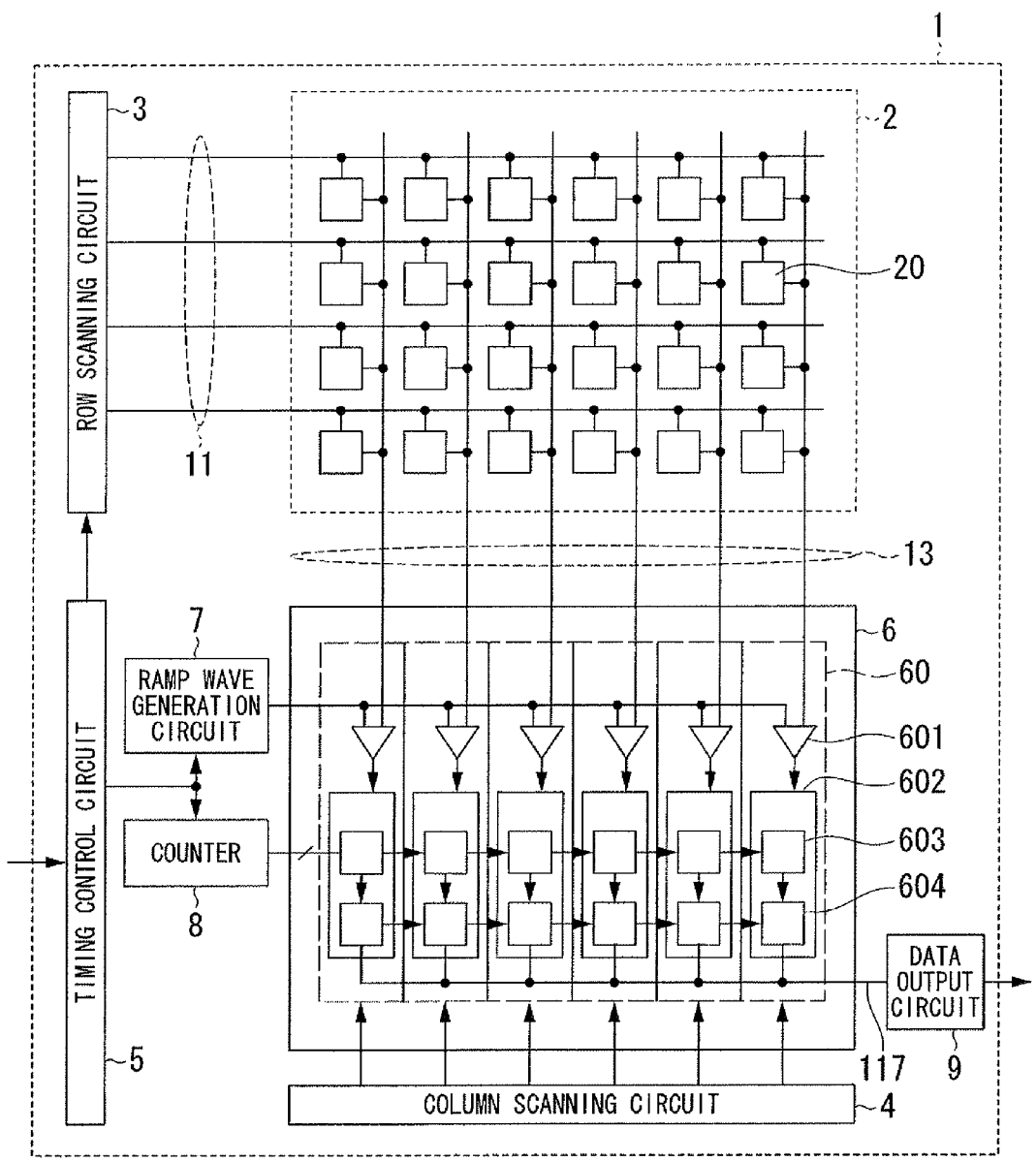
FIG. 14 is a block diagram illustrating a configuration of a conventional solid-state imaging device.

The control section 301 controls the solid-state imaging device 300 and the PLL circuit 302 but may be configured to be built, for example, in the timing control circuit 5 illustrated in FIG. 14. A concrete operation of this example is almost the same as the operation of the configuration illustrated in FIGS. 7 and 14, and a description thereof is omitted. In the above-described configuration, a transmission time in the column scanning circuit 305 (which is equal to a delay time of the delay unit) can be set as a time according to a desired clock frequency by the PLL circuit 302. The VCO that configures the PLL preferably has the same configuration as the delay unit in the column scanning circuit but is not limited thereto.

According to the present embodiment, it is possible to easily implement the high speed scanning circuit of the solid-state imaging device. Further, the operation frequency for data transmission can be controlled.

(Eighth Embodiment)

Figure 10:
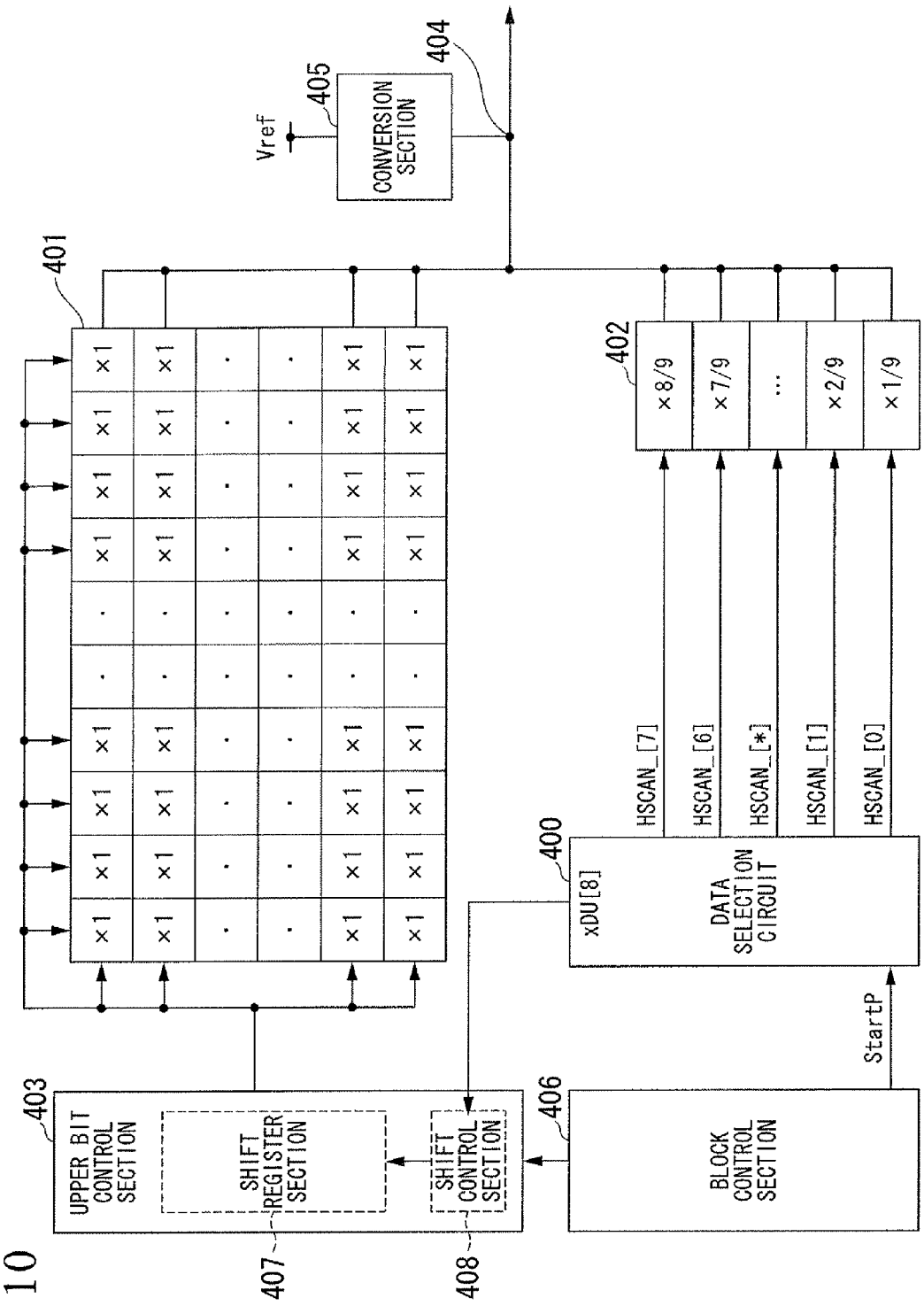
FIG. 10 is a block diagram illustrating a configuration of a ramp wave generation circuit according to an eighth embodiment of the present invention.

Next, an eighth embodiment of the present invention will be described. FIG. 10 illustrates a configuration of a ramp wave generation circuit according to the present embodiment. The ramp wave generation circuit illustrated in FIG. 10 includes a data selection circuit 400, an upper current source cell section 401, a lower current source cell section 402, an upper bit control section 403, an addition section 404, a conversion section 405, and a block control section 406. For example, the ramp wave generation circuit corresponds to the ramp wave generation circuit 7 of FIG. 14.

Hereinafter, a configuration of the ramp wave generation circuit illustrated in FIG. 10 will be described. A configuration of the data selection circuit 400 is the same as the configuration of the data selection circuit illustrated in FIG. 4, and thus a description thereof is omitted. The upper current source cell section 401 and the lower current source cell section 402 are functional circuits that implement a function for generation of an electric current.

The upper current source cell section 401 includes a plurality of upper current source cells (cells designated as "×1" in the drawing) that generate the same constant electric current. The upper current source cells are arranged in the form of a matrix.

The lower current source cell section 402 includes a plurality of lower current source cells (cells designated as "×⅑" or the like in the drawing). The individual lower current source cell sections 402 have been weighted to generate current values that are different from each other by one ninth current values of constant currents generated by the individual upper current source cells that configure the upper current source cell section 401. That is, if a current value of a constant current generated by one upper current source cell is "I," the lower current source cells that configure the lower current source cell section 402 generate electric currents having current values of I/9, 2×I/9, 3×I/9, . . . , and 8×I/9, respectively. Each lower current source cell has a first data selection pulse input terminal to which a signal (a lower selection signal) output from the delay unit in the data selection circuit 400 is input.

The upper bit control section 403 includes a shift register section 407 that generates an upper selection signal for selecting the upper current source cell and outputs the upper selection signal to the upper current source cell section 401 and a shift control section 408 that generates a shift clock, which causes the shift register section 407 to perform a shift operation, based on the output of the data selection circuit 400. The shift register section 407 includes shift register circuits that are almost the same in number as the upper current source cells. The shift control section 408 has a second data selection pulse input terminal to which the inverted signal of the output of the final stage delay unit DU[8] in the data selection circuit 400 is input.

The addition section 404 adds a constant current output from the upper current source cell that configures the upper current source cell section 401 and a constant current output from the lower current source cell that configures the lower current source cell section 402 and outputs the added current. The conversion section 405 converts the current output from the addition section 404 into a voltage signal and outputs the voltage signal. It is supposed that, for example, a resistive element or a capacitive element is used in the conversion section 405, but the present invention is not limited thereto. The block control section 406 controls the above-described sections and circuits.

Figure 11:
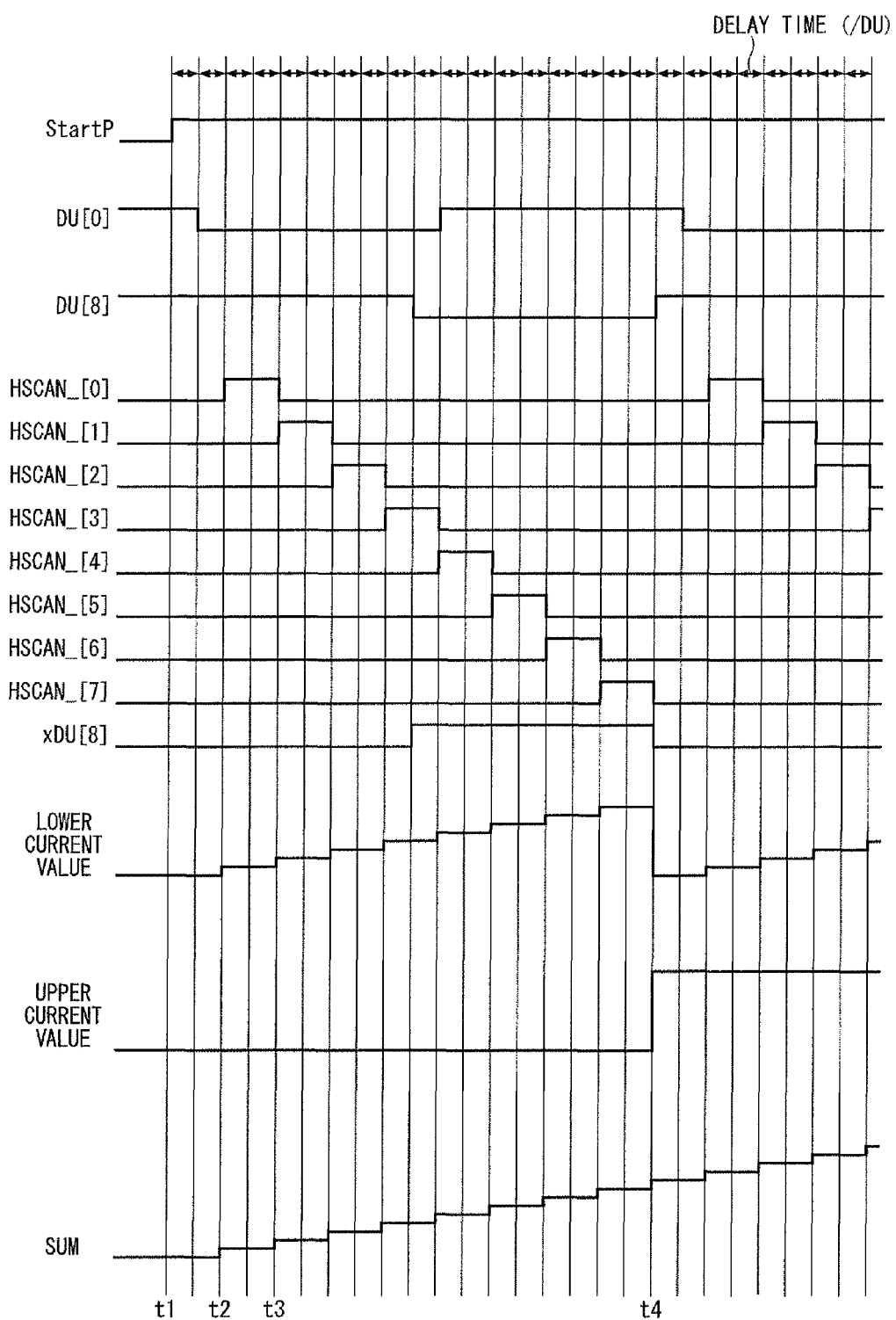
FIG. 11 is a timing chart illustrating an operation of the ramp wave generation circuit according to the eighth embodiment of the present invention.

Next, an operation of the ramp wave generation circuit illustrated in FIG. 10 will be described with reference to a timing chart of FIG. 11. In FIG. 11, a lower current value represents a total value of currents output from the lower current source cells of the lower current source cell section 402. An upper current value represents a total value of currents output from the upper current source cells of the upper current source cell section 401. A sum represents a result of adding the upper current value and the lower current value.

In a state before an operation starts, the logical states of the start pulse (=StartP) and the output HISCAN_[*] of the data selection circuit 400 (* ranges from 0 to 7) are Low. The lower current value, the upper current value, and the sum are zero (0). First, at a time t1, the logical state of the start pulse changes from Low to High, so that the delay units in the data selection circuit 400 start a transition operation. Thereafter, in response to the transition operation of the delay unit, the logical states of the outputs HSCAN_[*] of the data selection circuit sequentially become High.

At a time t2, when the logical state of the outputs HSCAN_[0] HSCAN_[0] of the data selection circuit 400 becomes High, the lower current source cell (in FIG. 9, a cell designated as "×1/9") having the first data selection pulse input terminal to which the output HSCAN_[0] HSCAN_[0] is input is selected and outputs an electric current. The lower current value at this time is assumed to be I/9. Subsequently, at a time t3, when the logical state of the outputs HSCAN_[0] HSCAN_[0] of the data selection circuit 400 becomes Low, selection of the lower current source cell is released, and output of the electric current stops. Further, at the time t3, when the logical state of the outputs HSCAN_[1]HSCAN_[1] of the data selection circuit 400 becomes High, the lower current source cell (in FIG. 9, a cell designated as "×2/9") having the first data selection pulse input terminal to which the output HSCAN_[1]HSCAN_[1] is input is selected and outputs an electric current. As a result, at the time t3, the lower current value increases more than at the time t2 and becomes 2×I/9. By repeating this operation, the corresponding lower current source cells are selected, and the lower current value increases by I/9.

At a time t4, when the logical state of the output HSCAN_[7] becomes Low, selection of the lower current source cell (in FIG. 9, a cell designated as "×8/9") having the first data selection pulse input terminal to which the output HSCAN_[7] is input is released, and output of the electric current stops. As a result, the lower current value becomes zero (0). At the same time, when the logical state of the inverted signal of the output of the final stage delay unit DU[8] in the data selection circuit 400 becomes Low, the shift control section 408 generates the shift clock and outputs the shift clock to the shift register 407. The shift register section 407 shifts by one stage in response to the shift clock, the corresponding upper current source cell is selected, and so the upper current value increases by I.

Thereafter, the lower current source cell is selected in the same manner as described above, and thus the lower current value increases by I/9.

At a timing at which the logical state of the output HSCAN_[7] becomes Low, selection of the lower current source cell is released, and so the lower current value becomes zero (0). At the same time, the logical state of the inverted signal of the output of the final stage delay unit DU[8] in the data selection circuit 400 becomes Low, the shift register section 407 shifts by one stage, the corresponding upper current source cell is selected, and the upper current value increases by I. Thereafter, the above-described operation is repeated.

According to the present embodiment, it is unnecessary to perform shaping of the driving clock for driving the data selection circuit in order to select the current source cell, and the current source cell, particularly, the lower current source cell can be selected at a high speed. Further, since the lower current source cell and the upper current source cell can be selected almost at the same time, it is possible to easily suppress the occurrence of a glitch or a miscode, and the ramp wave generation operation can be stably performed.

(Ninth Embodiment)

Figure 12:
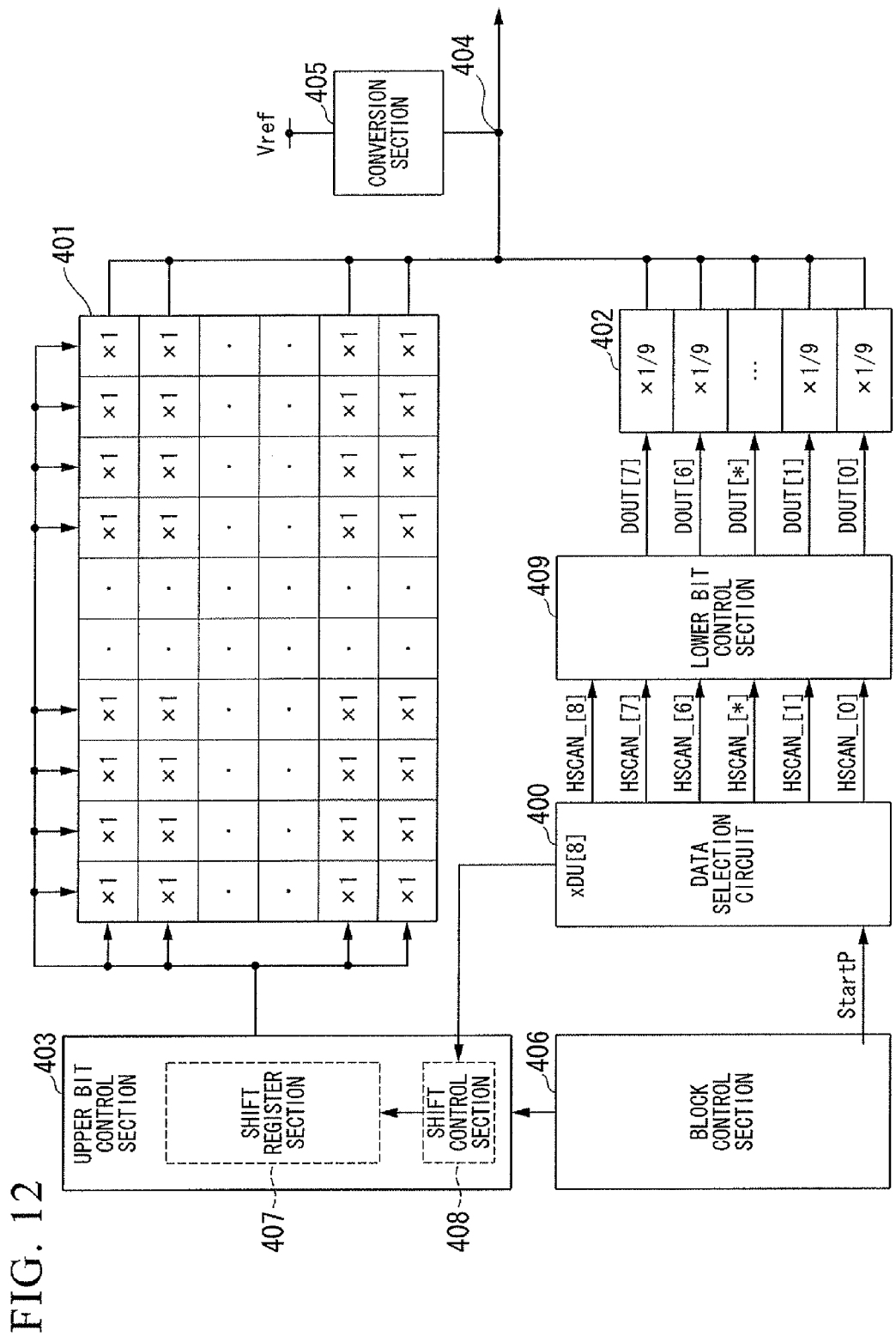
FIG. 12 is a block diagram illustrating a configuration of a ramp wave generation circuit according to a ninth embodiment of the present invention.

Next, a ninth embodiment of the present invention will be described. FIG. 12 illustrates a configuration of a ramp wave generation circuit according to the present embodiment. The ramp wave generation circuit illustrated in FIG. 12 includes a data selection circuit 400, an upper current source cell section 401, a lower current source cell section 402, an upper bit control section 403, an addition section 404, a conversion section 405, a block control section 406, and a lower bit control section 409. For example, the ramp wave generation circuit corresponds to the ramp wave generation circuit 7 of FIG. 14.

Hereinafter, a configuration of the ramp wave generation circuit illustrated in FIG. 12 will be described. The lower bit control section 409 has a first data selection pulse input terminal to which the outputs HSCAN_[0] HSCAN_[0] to HSCAN_[8] of the data selection circuit 400 are input and controls the lower current source cell section 402 based on the outputs HSCAN_[0] to HSCAN_[8] of the data selection circuit 400. Further, the individual lower current source cells that configure the lower current source cell section 402 generate the same current value (one ninth (1/9) the current value generated by the upper current source cell in the upper current source cell section 401). The remaining configuration is the same as the configuration of the ramp wave generation circuit illustrated in FIG. 10, and thus a description thereof is omitted.

Figure 13:
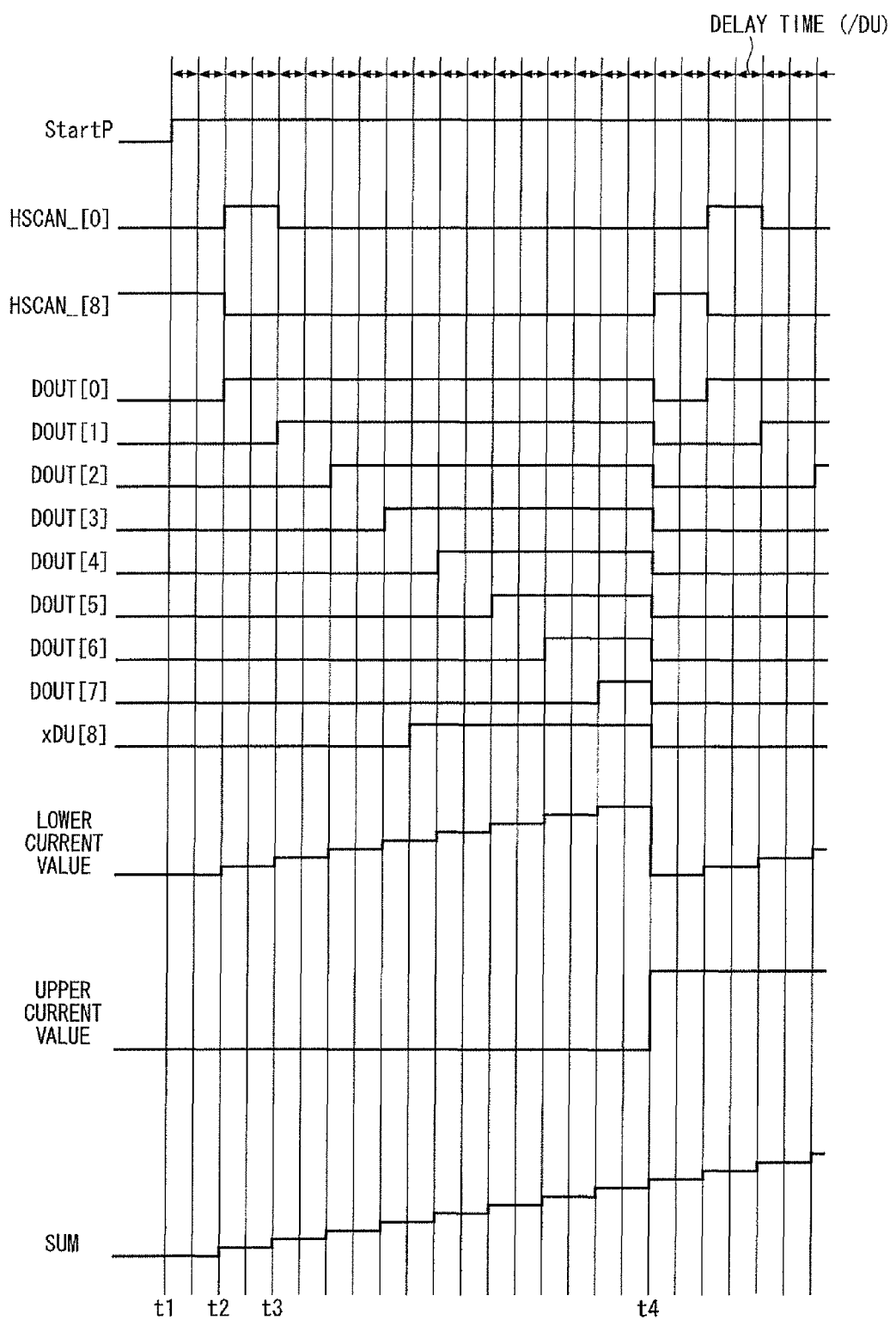
FIG. 13 is a timing chart illustrating an operation of the ramp wave generation circuit according to the ninth embodiment of the present invention.

Next, an operation of the ramp wave generation circuit illustrated in FIG. 12 will be described with reference to a timing chart of FIG. 13. The follow description will be made in connection with parts different from the operation described in the eighth embodiment. At a time t2, when the logical state of the outputs HSCAN_[0] HSCAN_[0] of the data selection circuit 400 becomes High, the lower bit control section 409 causes a logical state of a control signal DOUT[0] to transition to High and outputs the control signal to a first lower current source cell. As a result, the lower current source cell is selected and outputs an electric current. The lower current value at this time is assumed to be I/9.

Subsequently, at a time t3, at the same time when the logical state of the outputs HSCAN_[0] HSCAN_[0] of the data selection circuit becomes Low, the lower bit control section 409 causes a logical state of a control signal DOUT[1] to transition to High and outputs the control signal to a second lower current source cell. Thus, the lower current source cell is selected and outputs an electric current. As a result, at the time t3, the lower current value increases more than at the time t2 and becomes 2×I/9. By repeating this operation, the corresponding lower current source cells are selected, and the lower current value increases by I/9.

At a time t4, when the logical state of the outputs HSCAN_[8] becomes High, the lower bit control section 409 causes the logical states of the control signals DOUT[0] to DOUT[7] to all of the lower current source cells to transition to Low. Thus, selection of all of the lower current source cells is released, and output of an electric current stops. As a result, the lower current value becomes zero (0). At the same time, when the logical state of the inverted signal of the output of the final stage delay unit DU[8] in the data selection circuit 400 becomes Low, the shift control section 408 generates the shift clock and outputs the shift clock to the shift register section 407. In response to the shift clock, the shift register section 407 shifts by one stage, the corresponding upper current source cell is selected, and the upper current value increases by I.

Thereafter, the lower current source cells are sequentially selected in the same manner as described above, and thus the lower current value increases by I/9.

At a timing at which the logical state of the output HSCA_[8] becomes High, selection of all of the lower current source cells is released, and so the lower current value becomes zero (0). At the same time, the logical state of the inverted signal of the output of the final stage delay unit DU[8] in the data selection circuit 400 becomes Low, the shift register section 407 shifts by one stage, the corresponding upper current source cell is selected, and the upper current value increases by I. Thereafter, the above-described operation is repeated.

According to the present embodiment, it is unnecessary to perform shaping of the driving clock for driving the data selection circuit in order to select the current source cell, and the current source cell, particularly, the lower current source cell, can be selected at a high speed. Further, since the lower current source cell and the upper current source cell can be selected almost at the same time, it is possible to easily suppress the occurrence of a glitch or a miscode, and the ramp wave generation operation can be stably performed.

The embodiments of the present invention have been described above, but the present invention is not limited to the above embodiments. Addition, omission, substitution, and other changes of a configuration may be made within the scope not departing from the gist of the invention. The present invention is not limited to the above description but limited only by the accompanying claims.

The invention claimed is:

1. A data selection circuit, comprising:
   a delay section that includes delay units of n stages (n is a natural number equal to or more than 3) that are connected to each other, delays signals input to the delay units, and outputs the delayed signals from the delay units;
   a delay control section that controls delay amounts of the delay units; and
   an output section that performs a logical operation on signals output from i-th and j-th (i and j are natural numbers that are different from each other and equal to or more than 1 and equal to or less than n) delay units to generate a signal, which has a predetermined logical state at a predetermined timing, and outputs the generated signal to a k-th (k is a natural number equal to or more than 1 and equal to or less than m) first data selection pulse input terminal of a functional circuit having m (m is a natural number equal to or more than 2) first data selection pulse input terminals,
   wherein the delay section configures an annular delay circuit in which the delay units are connected in the form of a ring so that a signal output from an n-th stage delay unit is input to a first stage delay unit.

2. The data selection circuit according to claim 1, wherein the output section further outputs one of an output of the delay unit and the signal generated by the logical operation.

3. A data selection circuit, comprising:
   a delay section that includes delay units of n stages (n is a natural number equal to or more than 3) that are connected to each other, delays signals input to the delay units, and outputs the delayed signals from the delay units;
   a delay control section that controls delay amounts of the delay units; and
   an output section that performs a logical operation on signals output from i-th and j-th (i and j are natural numbers that are different from each other and equal to or more than 1 and equal to or less than n) delay units to generate a signal, which has a predetermined logical state at a predetermined timing, and outputs the generated signal to a k-th (k is a natural number equal to or more than 1 and equal to or less than m) first data selection pulse input terminal of a functional circuit having m (m is a natural number equal to or more than 2) first data selection pulse input terminals,
   wherein the output section further outputs one of an output of the delay unit and the signal generated by the logical operation.

4. A ramp wave generation circuit, comprising:
   a data selection circuit, comprising:
      a delay section that includes delay units of n stages (n is a natural number equal to or more than 3) that are connected to each other, delays signals input to the delay units, and outputs the delayed signals from the delay units;
      a delay control section that controls delay amounts of the delay units; and
      an output section that performs a logical operation on signals output from i-th and j-th (i and j are natural numbers that are different from each other and equal to or more than 1 and equal to or less than n) delay units to generate a signal, which has a predetermined logical state at a predetermined timing, and outputs the generated signal to a k-th (k is a natural number equal to or more than 1 and equal to or less than m) first data selection pulse input terminal of a functional circuit having m (m is a natural number equal to or more than 2) first data selection pulse input terminals; and a functional circuit, wherein the functional circuit includes:

an upper current source cell section that includes a plurality of upper current source cells generating the same constant current and is capable of selecting the upper current source cell outputting the constant current based on an upper selection signal;

an upper bit control section that includes a second data selection pulse input terminal, generates the upper selection signal based on a signal input to the second data selection pulse input terminal, and controls the upper current source cell section;

a lower current source cell section that includes a plurality of lower current source cells that have been weighted to generate current values that are different from each other by a predetermined rate to a current value of the constant current generated by the upper current source cell and a first data selection pulse input terminal and is capable of selecting the lower current source cell outputting an electric current based on a lower selection signal input to the first data selection pulse input terminal;

an addition section that adds electric currents output from the selected upper current source cell and lower current source cell and outputs the added electric current; and a conversion section that converts the electric current output from the addition section into a voltage and outputs the voltage, and the data selection circuit outputs a signal as the lower selection signal to the first data selection pulse input terminal and outputs a signal to the second data selection pulse input terminal.

5. The ramp wave generation circuit according to claim 4, wherein the upper bit control section includes shift register circuits that are almost the same in number as the upper current source cells, and the shift register circuits use a signal input to the second data selection pulse input terminal as a shift clock, cause shift outputs of the shift register circuits to sequentially become active based on the shift clock, generate the upper selection signal based on the shift outputs, and select the upper current source cell.

6. A solid-state imaging device, comprising:

an imaging section in which a plurality of pixels outputting a pixel signal in response to the intensity or the quantity of an incident electromagnetic wave are arranged in the form of a matrix; and the ramp wave generation circuit according to claim 5.

7. A solid-state imaging device, comprising:

an imaging section in which a plurality of pixels outputting a pixel signal in response to the intensity or the quantity of an incident electromagnetic wave are arranged in the form of a matrix; and the ramp wave generation circuit according to claim 4.

8. A ramp wave generation circuit, comprising:

a data selection circuit, comprising:

a delay section that includes delay units of n stages (n is a natural number equal to or more than 3) that are connected to each other, delays signals input to the delay units, and outputs the delayed signals from the delay units;

a delay control section that controls delay amounts of the delay units; and an output section that performs a logical operation on signals output from i-th and j-th (i and j are natural numbers that are different from each other and equal to or more than 1 and equal to or less than n) delay units to generate a signal, which has a predetermined logical state at a predetermined timing, and outputs the generated signal to a k-th (k is a natural number equal to or more than 1 and equal to or less than m) first data selection pulse input terminal of a functional circuit having m (m is a natural number equal to or more than 2) first data selection pulse input terminals; and a functional circuit, wherein the functional circuit includes:

an upper current source cell section that includes a plurality of upper current source cells generating the same constant current and is capable of selecting the upper current source cell outputting the constant current based on an upper selection signal;

an upper bit control section that includes a second data selection pulse input terminal, generates the upper selection signal based on a signal input to the second data selection pulse input terminal, and controls the upper current source cell section;

a lower current source cell section that includes a plurality of lower current source cells that generate current values of a predetermined rate to a current value of the constant current generated by the upper current source cell and is capable of selecting the lower current source cell outputting an electric current;

a lower bit control section that has a first data selection pulse input terminal and controls the lower current source cell section based on a lower selection signal input to the first data selection pulse input terminal;

an addition section that adds electric currents output from the selected upper current source cell and the lower current source cell and outputs the added electric current; and a conversion section that converts the electric current output from the addition section into a voltage and outputs the voltage, and the data selection circuit outputs a signal as the lower selection signal to the first data selection pulse input terminal and outputs a signal to the second data selection pulse input terminal.

9. The ramp wave generation circuit according to claim 8, wherein the upper bit control section includes shift register circuits that are almost the same in number as the upper current source cells, and the shift register circuits use a signal input to the second data selection pulse input terminal as a shift clock, cause shift outputs of the shift register circuits to sequentially become active based on the shift clock, generate the upper selection signal based on the shift outputs, and select the upper current source cell.

10. A solid-state imaging device, comprising:

an imaging section in which a plurality of pixels outputting a pixel signal in response to the intensity or the quantity of an incident electromagnetic wave are arranged in the form of a matrix; and the ramp wave generation circuit according to claim 9.

11. A solid-state imaging device, comprising:

an imaging section in which a plurality of pixels outputting a pixel signal in response to the intensity or the quantity of an incident electromagnetic wave are arranged in the form of a matrix; and the ramp wave generation circuit according to claim 8.

12. A data transmission circuit, comprising:
a scanning section that includes a data selection circuit, comprising:
- a delay section that includes delay units of n stages (n is a natural number equal to or more than 3) that are connected to each other, delays signals input to the delay units, and outputs the delayed signals from the delay units;
- a delay control section that controls delay amounts of the delay units; and
- an output section that performs a logical operation on signals output from i-th and j-th (i and j are natural numbers that are different from each other and equal to or more than 1 and equal to or less than n) delay units to generate a signal, which has a predetermined logical state at a predetermined timing, and outputs the generated signal to a k-th (k is a natural number equal to or more than 1 and equal to or less than m) first data selection pulse input terminal of a functional circuit having m (m is a natural number equal to or more than 2) first data selection pulse input terminals; and a functional circuit,
wherein the functional circuit includes
data retention sections of m stages that retain data corresponding to an input level and output the data based on a selection signal input to the first data selection pulse input terminals;
a transmission line through which the data output from the data retention section is transmitted; and
a detection section that is connected to the transmission line and detects the transmitted data, and
the scanning section outputs a signal output from the data selection circuit to the first data selection pulse input terminal as the data selection signal.

13. A solid-state imaging device, comprising:
an imaging section in which a plurality of pixels outputting a pixel signal in response to the intensity or the quantity of an incident electromagnetic wave are arranged in the form of a matrix; and
the data transmission circuit according to claim 12.

* * * * *